(12) United States Patent
Sim

(10) Patent No.: US 11,772,444 B2
(45) Date of Patent: Oct. 3, 2023

(54) SUSPENSION SYSTEM

(71) Applicant: HL MANDO CORPORATION, Pyeongtaek (KR)

(72) Inventor: Gyunghun Sim, Seongnam (KR)

(73) Assignee: HL MANDO CORPORATION, Pyeongtaek (KR)

(*) Notice: Subject to any disclaimer, the term of this patent is extended or adjusted under 35 U.S.C. 154(b) by 0 days.

(21) Appl. No.: 17/577,064

(22) Filed: Jan. 17, 2022

(65) Prior Publication Data

US 2022/0227194 A1    Jul. 21, 2022

(30) Foreign Application Priority Data

Jan. 18, 2021 (KR) .................. 10-2021-0006793

(51) Int. Cl.
*B60G 17/015* (2006.01)
*B60G 13/14* (2006.01)
(Continued)

(52) U.S. Cl.
CPC .......... *B60G 13/14* (2013.01); *B60G 17/0157* (2013.01); *H02K 7/1853* (2013.01);
(Continued)

(58) Field of Classification Search
CPC ................ B60G 13/14; B60G 17/0157; B60G 2300/60; B60G 2800/162; B60G 2202/24;
(Continued)

(56) References Cited

U.S. PATENT DOCUMENTS 4,905,807 A * 3/1990 Rohs ................. F16F 15/162
                                                  192/61
2013/0147205 A1* 6/2013 Tucker ................. B60G 11/265
                                                  290/1 A
(Continued)

FOREIGN PATENT DOCUMENTS

CN          201519388 U  *  7/2010
DE     102014225926 A1  *  6/2016
(Continued)

OTHER PUBLICATIONS

DE102014225926A1 English Translation (Year: 2023).*
(Continued)

*Primary Examiner* — Christopher M Koehler
*Assistant Examiner* — Viswanathan Subramanian
(74) *Attorney, Agent, or Firm* — Harvest IP Law, LLP

(57) ABSTRACT

Disclosed herein a suspension system includes a damper in which a piston valve is movably provided in a chamber inside a cylinder; and an actuator coupled to a side portion of the cylinder to communicate with the chamber inside the cylinder; wherein the actuator comprises a rotating body in which a rotational drive shaft coupled to a center thereof, the rotating body configured to be rotated by working fluid transmitted from the chamber during a stroke of the piston valve; a centrifugal valve coupled to the rotational drive shaft in front of the rotating body, the centrifugal valve rotating together with the rotating body and varying an area of a flow path hole through which the working fluid passes according to a rotational speed of the rotating body; and a generator combined motor in which the rotational drive shaft is rotatably arranged at a rear of the rotating body, the generator combined motor configured to charge by generating electric energy through the rotation of the rotational drive shaft.

9 Claims, 6 Drawing Sheets

(51) Int. Cl.
*H02K 7/18* (2006.01)
*H02K 11/04* (2016.01)
*H02K 11/00* (2016.01)

(52) U.S. Cl.
CPC ......... *H02K 11/0094* (2013.01); *H02K 11/04* (2013.01); *B60G 2300/60* (2013.01); *B60G 2800/162* (2013.01)

(58) Field of Classification Search
CPC ............ B60G 2206/41; B60G 2500/10; H02K 7/1853; H02K 11/0094; H02K 11/04; H02K 7/003; H02K 7/10; H02K 7/1807; F16F 9/062; F16F 9/34; F16F 9/342; F16K 31/122; H02J 7/14; H02M 7/42
See application file for complete search history.

(56) References Cited

U.S. PATENT DOCUMENTS

2015/0224845 A1\* 8/2015 Anderson ............ B60G 17/019
 701/37
2020/0112216 A1\* 4/2020 Galmiche ................ H02K 1/28

FOREIGN PATENT DOCUMENTS

| KR | 100259255 | B1 | | 6/2000 |
| KR | 20170016204 | A | \* | 2/2017 |
| KR | 20180008155 | A | | 1/2018 |

OTHER PUBLICATIONS

KR20170016204A English Translation (Year: 2023).\*
KR20180008155A English Translation (Year: 2023).\*
CN201519388U English translation (Year: 2023).\*

\* cited by examiner

[FIG. 1]
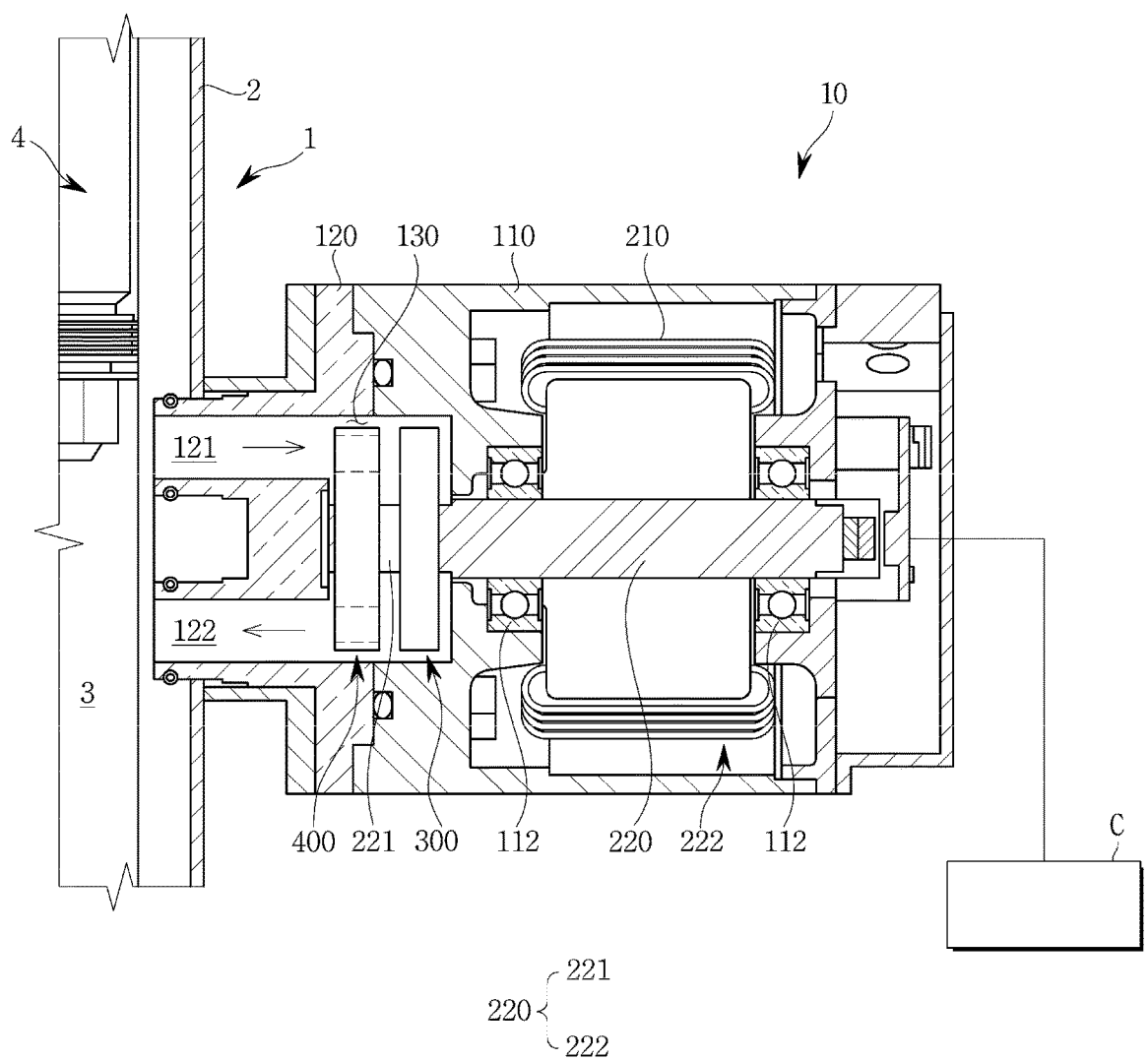

[FIG. 2]
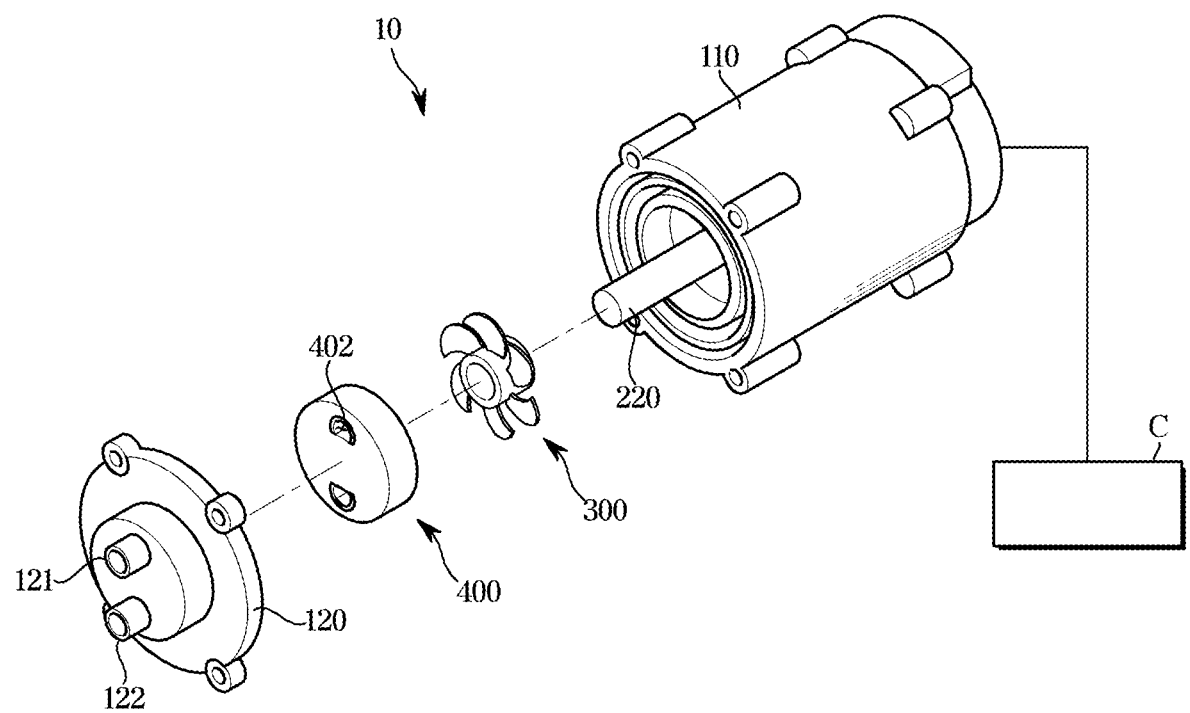

[FIG. 3]
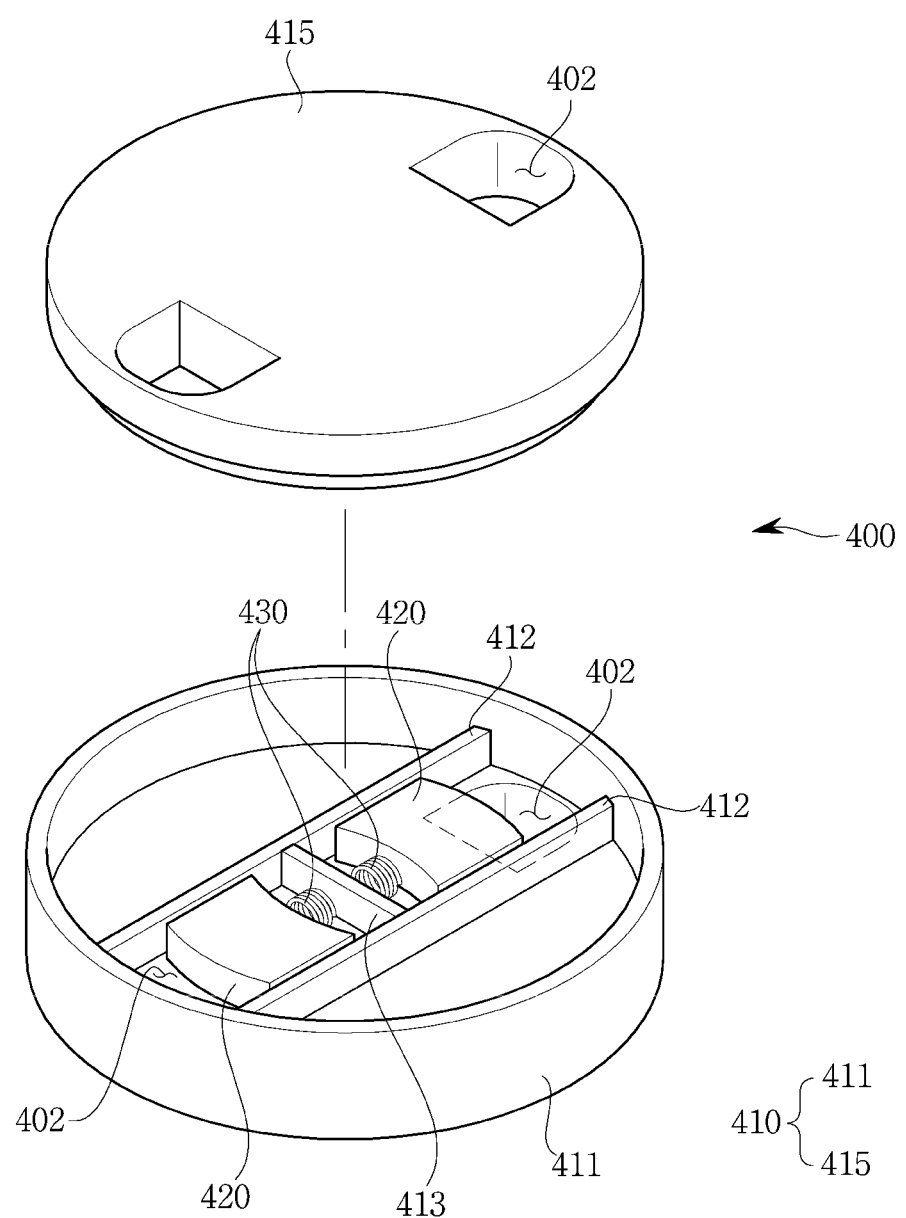

[FIG. 4]
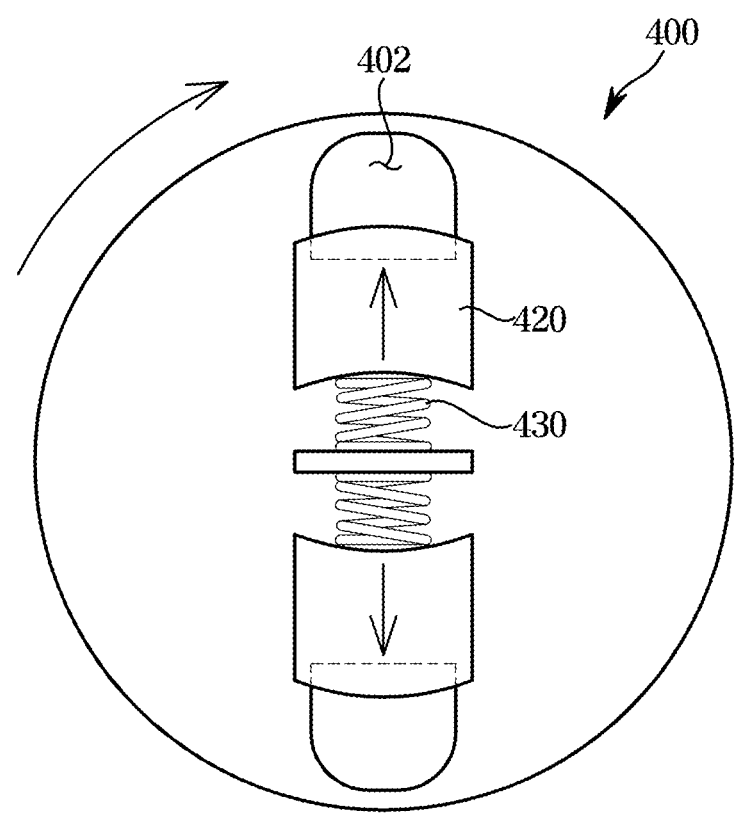
[LOW SPEED]

[FIG. 5]
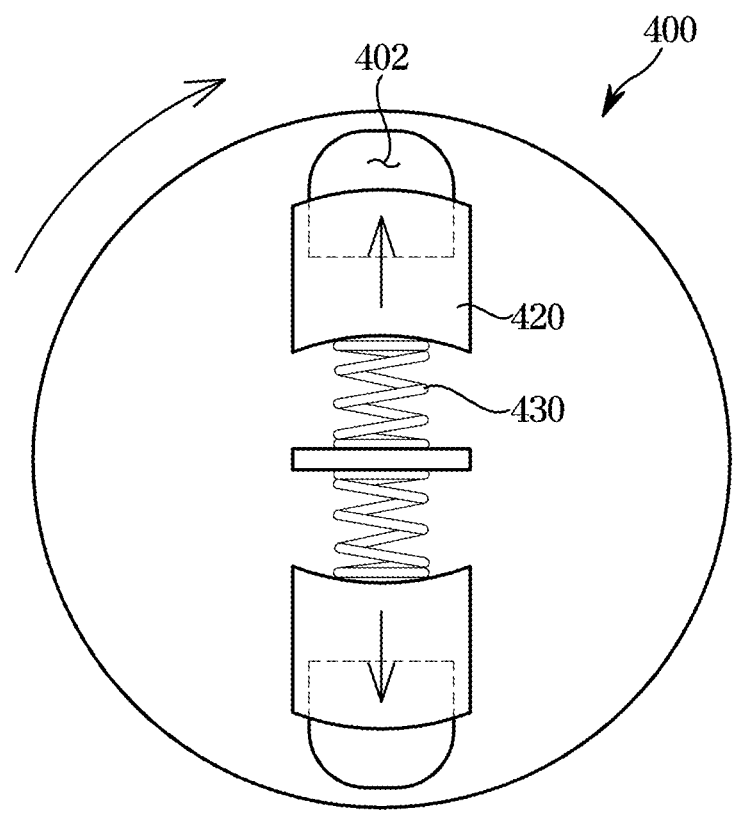
[MEDIUM SPEED]

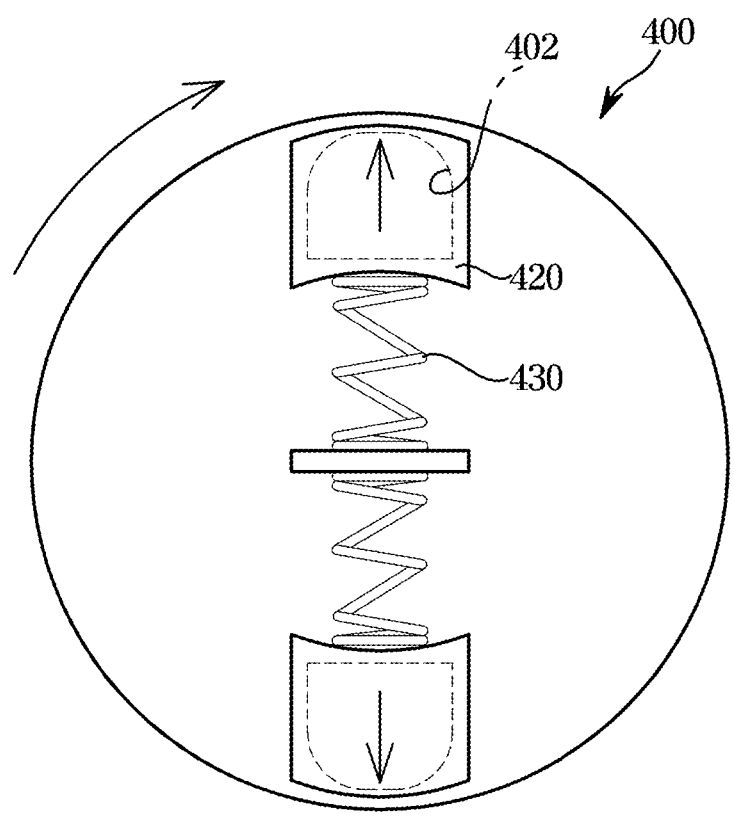
[FIG. 6]
[HIGH SPEED]

SUSPENSION SYSTEM

CROSS-REFERENCE TO RELATED APPLICATION(S)

This application is based on and claims priority under 35 U.S.C. § 119 to Korean Patent Application No. 10-2021-0006793, filed on Jan. 18, 2021 in the Korean Intellectual Property Office, the disclosure of which is incorporated herein by reference in its entirety.

TECHNICAL FIELD

The disclosure relates to a suspension system, and more particularly, to a suspension system including a damper that generates a damping force and an actuator that may control the damping force of the damper as well as generate electricity.

BACKGROUND

In general, a suspension system for a vehicle serves to support the weight of a vehicle body and suppress and damp vibrations transmitted from a road surface to the vehicle body thereof.

A conventional suspension system for a vehicle includes a carrier for rotatably supporting a wheel to which a road wheel is coupled, an upper arm for connecting an upper portion of the carrier to a vehicle body, a lower arm, assist arm and trailing arm for connecting a lower portion of the carrier to the vehicle body, a damper (shock absorber) connecting the upper portion of the carrier with the vehicle body, an elastic spring arranged between the lower arm and the vehicle body, a stabilizer bar fixed to the vehicle body, and a connecting links for connecting the stabilizer bar with the lower arm.

Recently, in a suspension system for a vehicle, a regenerative system for charging a storage battery by generating electricity using an impact transmitted from a road surface while the vehicle is traveling is proposed.

Such a conventional regenerative system is disclosed in Korean Patent Laid-Open No. 10-2012-0064846. In the above document, the regenerative device is installed on a suspension link arm of a vehicle and uses the shock transmitted to an axle of the vehicle, in other words, uses a method of recovering kinetic energy generated during rebounding as electrical energy.

However, because the conventional regenerative system has a complicated structure that is mechanically connected to the suspension link arm of the vehicle, the size of the device increases, so that securing an installation space is difficult. Furthermore, because an impact is transmitted through the mechanical connection, damage of the device due to the impact is occurred when a force is repeatedly applied to driving parts of the regenerative systems.

SUMMARY

An aspect of the disclosure is to provide a suspension system capable of securing easily an installation space by coupling directly an actuator capable of generating electricity to a damper.

Another aspect of the disclosure is to provide a suspension system capable of adjusting a damping force of the damper by varying an area of a flow path hole through which a working fluid passes, such that the damping force required in damping sections of a low speed, a medium speed, and a high speed is generated.

Additional aspects of the disclosure will be set forth in part in the description which follows and, in part, will be obvious from the description, or may be learned by practice of the disclosure.

In accordance with an aspect of the disclosure, a suspension system includes a damper in which a piston valve is movably provided in a chamber inside a cylinder; and an actuator coupled to a side portion of the cylinder to communicate with the chamber inside the cylinder; wherein the actuator comprises a rotating body in which a rotational drive shaft coupled to a center thereof, the rotating body configured to be rotated by working fluid transmitted from the chamber during a stroke of the piston valve; a centrifugal valve coupled to the rotational drive shaft in front of the rotating body, the centrifugal valve rotating together with the rotating body and varying an area of a flow path hole through which the working fluid passes according to a rotational speed of the rotating body; and a generator combined motor in which the rotational drive shaft is rotatably arranged at a rear of the rotating body, the generator combined motor configured to charge by generating electric energy through the rotation of the rotational drive shaft.

The suspension system may further include a housing whose one side is opened so that the generator combined motor, the rotating body, and the centrifugal valve are sequentially accommodated therein; and a cover coupled to close the opened side of the housing and provided with a connection port communicating with the chamber inside the cylinder.

A bypass flow path may be provided between an inner side of the cover and the centrifugal valve so that the working fluid introduced through the connection port flows into the rotating body.

The rotating body may be provided with a propeller having a plurality of blades arranged at regular intervals along a circumferential direction of the rotational drive shaft.

The centrifugal valve may include a valve body in which the rotational drive shaft is coupled to a center thereof, the valve body having at least one flow path hole formed therethrough in a radial direction about the rotational drive shaft; a valve cover installed on the valve body and moving in a radial direction according to the rotation of the valve body to open and close the flow path hole; and an elastic member coupled to the valve cover to elastically support the valve cover in a direction in which the flow path hole is opened.

The valve body may include a base plate including a pair of guide rods formed on one side thereof to support opposite sides of the valve cover so that the valve cover is slidable, and a fixing portion provided between the pair of guide rods so that one end of the elastic member is fixed, and a cover plate coupled to the one side of the base plate to prevent separation of the valve cover and the elastic member provided in the base plate; and wherein the base plate and the cover plate are provided with the flow path hole corresponding to positions at which the valve cover is moved in a radial direction, respectively.

The rotational drive shaft may include a first rotary shaft connected to the center of the rotating body and the centrifugal valve, and a second rotary shaft connected to the center of the rotating body and the generator combined motor, and the first and second rotary shafts are provided to be coaxially connected by a coupling provided at the center of the rotating body.

The generator combined motor may be electrically connected to an inverter configured to convert the generated electrical energy; a controller configured to control the current of the inverter; and a storage battery configured to store the electric energy converted by the inverter.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a cross-sectional view illustrating a suspension system according to an embodiment of the disclosure.

FIG. 2 is an exploded perspective view illustrating a suspension system according to an embodiment of the disclosure.

FIG. 3 is an exploded perspective view illustrating a centrifugal valve provided in a suspension system according to an embodiment of the disclosure.

FIGS. 4 to 6 are views illustrating an operating state of a centrifugal valve provided in a suspension system according to an embodiment of the disclosure.

DETAILED DESCRIPTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

FIG. 1 is a cross-sectional view illustrating a suspension system according to an embodiment of the disclosure, FIG. 2 is an exploded perspective view illustrating a suspension system according to an embodiment of the disclosure, FIG. 3 is an exploded perspective view illustrating a centrifugal valve provided in a suspension system according to an embodiment of the disclosure, and FIGS. 4 to 6 are views illustrating an operating state of a centrifugal valve provided in a suspension system according to an embodiment of the disclosure.

Referring to FIGS. 1 to 6, a suspension system according to an embodiment of the disclosure includes a damper 1 and an actuator 10.

The damper 1 is a device for damping shock or vibration during a vehicle operation, and may include a cylinder 2 (e.g., two or more) having a cylindrical shape forming a chamber 3 therein, a piston valve 4 provided to be reciprocally movable within the chamber 3 of the cylinder q, and a piston rod (not shown) connected to the piston valve. A working fluid is filled in the chamber 3 of the cylinder 2, and the chamber 3 is divided into a lower compression chamber and an upper rebound chamber by the piston valve. The piston valve performs compression or rebound strokes while being coupled to one end of the piston rod, and the other end of the piston rod extends to an outside of the cylinder 2 to be connected to an axle of the vehicle. The damper 1 is well-known technologies, so detailed description thereof is omitted, and only a cylinder (an outermost cylinder in case of a plurality of) is shown in FIG. 1.

The actuator 10 includes a generator combined motor 200, a rotating body 300, and a centrifugal valve 400. Furthermore, the actuator 10 further includes a housing 110 with one side open so that the motor 200, the rotating body 300, and the centrifugal valve 400 are sequentially accommodated, and cover a cover 120 coupled to close the one open side of the housing 110 and provided with connection ports 121 and 122 communicating with the chamber 3 inside the cylinder 2. The actuator 10 may adjust a damping force of the damper 1 by adjusting a flow amount of the working fluid according to the rebound or compression stroke of the damper 1. Furthermore, electricity may be generated using the flow of the working fluid. In other words, as will be described later, the rotating body 300 is rotated by the pressure of the working fluid flowing in from the damper 1, and a rotational drive shaft 220 connected to the generator combined motor 200 is rotated by the rotation of the rotating body 300. As a result, the generator combined motor 200 may be operated as a generator.

The generator combined motor 200 may be rotated by receiving electricity from an external power source, and the rotational direction or speed thereof may be controlled by an electronic control unit (ECU) of a vehicle equipped with a suspension system. For example, when the damper 1 is to be maintained hard, the generator combined motor 200 may be operated to control the flow of the working fluid by operating the centrifugal valve 400 to be described later. Furthermore, when the generator combined motor 200 is used as a generator, an electrical wire may be connected so that the generator combined motor 200 stores electric energy in a storage battery.

The generator combined motor 200 may include a stator 210 disposed on an inner surface of the housing 110, a rotor including the rotational drive shaft 220 disposed to be rotated within the housing 110. A part of the rotational drive shaft 220 protrudes toward an opening direction of the housing 110, and the rotating body 300 and the centrifugal valve 400 are fixedly connected to the protruding part of the rotational drive shaft 220. Herein, an embodiment of the disclosure is shown that the rotating body 300, the centrifugal valve 400, and the generator combined motor 200 are connected through one rotational drive shaft 220, it is not limited thereto, and if it is connected coaxially, the rotational drive shaft 220 may be divided and combined with each component. For example, the rotational drive shaft 220 may include a first rotary shaft 221 connected to a center of the rotating body 300 and the centrifugal valve 400, and a second rotary shaft 222 connected to a center of the rotating body 300 and the generator combined motor 200. The first and second rotary shafts 221, 222 may be provided to be coaxially connected by a coupling provided at the center of the rotating body 300. Accordingly, a the rotating body 300 rotates, the first and second rotary shafts 221, 222 rotate together, and the centrifugal valve 400 and the rotor connected to the first and second rotary shafts rotates.

An inverter for converting the generated electrical energy, a controller C for controlling current of the inverter and a storage battery for storing the electrical energy converted by the inverter may be electrically connected to the generator combined motor 200.

On the other hand, an undescribed reference numeral 112 denotes a bearing that supports the rotational drive shaft 220 so that the rotational drive shaft 220 rotates stably within the housing 110.

The cover 120 is coupled to close the one open side of the housing 110, and may be coupled to a side portion of the cylinder 2. The cover 120 may be provided with the connection ports 121 and 122 in fluidly communication with the chamber 3 inside the cylinder 2. The connection ports 121 and 122 may be divided into a first port 121 and a second port 122 for fluidly communicating the chamber 3 and the inside of the actuator 10. For example, the first port 121 may communicate with the rebound chamber of the chambers 3 of the cylinder 2, and the second port 122 may communicate with the compression chamber. The connection ports 121 and 122 communicate with a flow path hole 402 formed in the centrifugal valve 400 to be described later.

Meanwhile, a bypass flow path 130 may be provided between an inner side of the cover 120 and the centrifugal valve 400 so that the working fluid introduced through the connection ports 121 and 122 flows into the rotating body 300. The bypass flow path 130 may be formed in a groove shape inside the cover 120, or may be formed by a gap spaced apart from the centrifugal valve 400. The bypass flow path 130 serves to rotate the rotating body 300 by allowing hydraulic pressure generated during the stroke of the damper 1 to be directly transmitted to the rotating body 300.

In other words, when the piston valve performs a stroke, the rotating body 130 rotates while the working fluid flows in through the bypass flow path 130. In this process, the centrifugal valve 400 connected to the rotational drive shaft 220 rotates in one direction, as well as the rotor of the generator combined motor 200 rotates together. Accordingly, the generator combined motor 200 charges the storage battery with electrical energy generated through the rotation of the rotational drive shaft 220.

The rotating body 300 is provided to be rotated by the working fluid transmitted from the chamber 3 during the stroke of the piston valve. Furthermore, the rotating body 300 may be provided as a propeller comprising a plurality of blades through which the rotational drive shaft 220 is coupled through the center thereof, and the plurality of blades is arranged at regular intervals along a circumferential direction of the rotational drive shaft 220. The rotating body 300 is rotated by the working fluid introduced along the bypass flow path 130, and rotates the rotational drive shaft 220 to rotate the centrifugal valve 400, and at the same time, generates electricity to the generator combined motor 200. Meanwhile, a rotational speed of the rotating body 300 may be determined by a hydraulic force generated in response to the stroke of the piston valve. For example, the rotating body 300 rotates rapidly in a high speed damping section to generate a high rotational force, and rotates slowly in a low speed damping section to generate a low rotational force.

The centrifugal valve 400 may be coupled to the rotational drive shaft 200 at the front of the rotating body 300 to rotate together with the rotational driveshaft 220 according to the rotation of the rotating body 300. The centrifugal valve 400 may be provided to vary an area of the flow path hole 402 through which the working fluid passes according to the rotational speed of the rotating body 300. At this time, the flow path hole 402 communicates with the connection ports 121 and 122 so that the working fluid in the chamber 3 flows into the actuator 10. The centrifugal valve 400 may include a valve body 410, a valve cover 420, and an elastic member 430.

In particular, the valve body 410 is coupled to a rotational drive shaft 220 at the center thereof, and at least one flow path hole 402 is formed through the rotational drive shaft 220 in a radial direction about the rotational drive shaft 220. The valve body 410 includes a base plate 411 provided to support the valve cover 420 and the elastic member 430, and a cover plate 415 coupled to the base plate 411.

A pair of guide rods 412 for supporting opposite sides of the valve cover 420 may be provided on one side of the base plate 411 so that the valve cover 420 may be slidably. Two flow path holes 402 having a phase difference of 180 degrees with respect to the center thereof are formed passing through the base plate 411. Accordingly, the pair of guide rods 412 are positioned on the both side surfaces of the two flow path holes 402 to guide the valve cover 420 to move stably.

Furthermore, a fixing portion 413 may be provided on one side of the base plate 411 between the pair of guide rods 412 so that one end of the elastic member 430 is fixed. In other words, one end of the elastic member 430 is fixed to the fixing portion 413 and the other end thereof is coupled to the valve cover 420.

The rotational drive shaft 220 is coupled to the center of the other side of the base plate 411, so that the base plate 411 rotates with the rotation of the rotational drive shaft 220.

The cover plate 415 is coupled to one side of the base plate 411 and rotates together with the base plate 411, as well as serves to prevent separation of the valve cover 420 and the elastic member 430 provided in the base plate 411. The flow path hole 402 is formed in the cover plate 415 at a position corresponding to the flow path hole 402 formed in the base plate 411.

As the centrifugal valve 400 rotates, the valve cover 420 moves in a radial direction relative to the center of the centrifugal valve 400 by a centrifugal force. At this time, a moving distance of the valve cover 420 may be changed according to the rotational speed of the centrifugal valve 400. For example, as shown in FIG. 4, when the centrifugal valve 400 is rotated at a low speed, the valve cover 420 may be slid to close a part of the flow path hole 402. Furthermore, as shown in FIG. 5, when the centrifugal valve 400 rotates at a medium speed the valve cover 420 may be slid to close about half of the flow path hole 402. Furthermore, as shown in FIG. 6, when the centrifugal valve 400 rotates at high speed the valve cover 420 may be slid to completely close the flow path hole 402. As such, the damping force may be controlled by adjusting the flow amount of the working fluid according to the degree of opening and closing of the flow path hole 402. The valve cover 420 moved in the radial direction may be returned to its original position by elastic restoring force of the elastic member 430.

On the other hand, in the centrifugal valve 400 of the embodiment, because the two flow path holes 402 having a phase difference of 180 degrees from each other are formed passing through the centrifugal valve 400, the valve cover 420 and the elastic member 430 are provided as a pair, respectively, but it is not limited thereto. The flow path holes 402, the valve cover 420 and the elastic member 430 may be selectively increased or decreased by having a corresponding number to each other.

Furthermore, although the suspension system according to an embodiment of the disclosure has been illustrated and described as being coupled to the side portion of the cylinder 2, it is not limited thereto, and may be coupled to a lower portion of the cylinder 2.

In the suspension system as described above, the rotating body 300 rotates by the working fluid flowing in from the chamber 3 of the cylinder 2 during the stroke of the damper 1 to operate the centrifugal valve 400 and generate electric energy. In other words, in response to the rotational speed of the rotating body 300, the flow amount of the working fluid through the centrifugal valve 400 may be controlled, as well as electric energy may be obtained by rotating the rotational drive shaft 220 connected to the generator combined motor 200.

Such a suspension system may be operated in a regenerative mode during a general road driving. In other words, the working fluid of the damper 1 is pressurized by the stroke of the piston valve and flows, and the rotating body 300 is rotated by as the working fluid. Accordingly, the rotational drive shaft 220 is rotated together with the rotating body 300, so that the generator combined motor 200 connected thereto may be generate electricity. Furthermore, the centrifugal valve 400 rotates together with the rotating body 300 and controls the degree of opening and closing of the flow path hole 402 in response to the rotational speed thereof, so that the damping force required may be provided.

On the other hand, the suspension system may be operated in an active mode when the vehicle is traveling on a rough road or when it is necessary to maximize handling performance. In this case, electricity is supplied to the generator combined motor 200 to rotate the rotational drive shaft 220, and the flow of the working fluid is controlled through the centrifugal valve 400, so that the damping force of the damper 1 may be made much harder or softer.

As a result, the suspension system according to the embodiment of the disclosure actively adjusts the damping force of the damper according to driving conditions of the vehicle to reduce a roll, a pitch, a heave motion, etc., thereby improving adjustment stability, as well as generating electric energy.

As is apparent from the above, the embodiments of the disclosure may provide the suspension system having the effect of securing easily the installation space by directly coupling the actuator capable of generating electricity using hydraulic pressure according to the stroke of the damper.

In addition, by using the centrifugal valve to vary the area of the flow path holes through which the working fluid passes in response the rotational speed, the damping force required in damping sections of low speed, medium speed, and high speed may be adjusted, thereby improving riding comfort.

As described above, although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A suspension system, comprising:
a damper in which a piston valve is movably provided in a chamber inside a cylinder; and
an actuator coupled to a side portion of the cylinder to communicate with the chamber inside the cylinder;
wherein the actuator comprises:
a rotating body in which a rotational drive shaft coupled to a center thereof, the rotating body configured to be rotated by working fluid transmitted from the chamber during a stroke of the piston valve;
a centrifugal valve coupled to the rotational drive shaft in front of the rotating body, the centrifugal valve rotating together with the rotating body and varying an area of a flow path hole through which the working fluid passes according to a rotational speed of the rotating body; and
a generator combined motor in which the rotational drive shaft is rotatably arranged at a rear of the rotating body, the generator combined motor configured to generate electric energy through the rotation of the rotational drive shaft,
wherein the centrifugal valve comprises:
a valve body in which the rotational drive shaft is coupled to a center thereof, the valve body having at least one flow path hole formed therethrough in a radial direction about the rotational drive shaft;
a valve cover installed on the valve body and moving in a radial direction according to the rotation of the valve body to open and close the flow path hole; and
an elastic member configured to elastically support the valve cover in a direction toward the flow path hole, a radially outer end of the elastic member being coupled to the valve cover and a radially inner end of the elastic member being disposed toward a radial center of the valve body,
wherein the elastic member is configured to be stretched radially outwardly such that the valve cover moves radially outwardly toward the flow path hole, when the rotational drive shaft rotates.

2. The suspension system of claim 1, further comprising:
a housing whose one side is opened so that the generator combined motor, the rotating body, and the centrifugal valve are sequentially accommodated therein; and
a cover coupled to close the opened side of the housing and provided with a connection port communicating with the chamber inside the cylinder.

3. The suspension system of claim 2, wherein
a bypass flow path is provided between an inner side of the cover and the centrifugal valve so that the working fluid introduced through the connection port flows into the rotating body.

4. The suspension system of claim 1, wherein
the rotating body is provided with a propeller having a plurality of blades arranged at regular intervals along a circumferential direction of the rotational drive shaft.

5. The suspension system of claim 1, wherein the valve body comprises:
a base plate including a pair of guide rods formed on one side thereof to support opposite sides of the valve cover so that the valve cover is slidable, and a fixing portion provided between the pair of guide rods so that one end of the elastic member is fixed, and
a cover plate coupled to the one side of the base plate to prevent separation of the valve cover and the elastic member provided in the base plate; and
wherein the base plate and the cover plate are provided with the flow path hole corresponding to positions at which the valve cover is moved in a radial direction, respectively.

6. The suspension system of claim 1, wherein the rotational drive shaft comprises
a first rotary shaft connected to the center of the rotating body and the centrifugal valve, and a second rotary shaft connected to the center of the rotating body and the generator combined motor, and
the first and second rotary shafts are provided to be coaxially connected by a coupling provided at the center of the rotating body.

7. The suspension system of claim 1, wherein the generator combined motor is electrically connected to
an inverter configured to convert the generated electrical energy;

a controller configured to control the current of the inverter; and a storage battery configured to store the electric energy converted by the inverter.

8. The suspension system of claim 1, wherein the elastic member is configured to be more stretched radially outwardly such that the valve cover closes more part of the flow path hole, as the rotational speed of the rotational drive shaft becomes higher.

9. A suspension system, comprising:

a damper in which a piston valve is movably provided in a chamber inside a cylinder; and an actuator coupled to a side portion of the cylinder to communicate with the chamber inside the cylinder;

wherein the actuator comprises:

a rotating body in which a rotational drive shaft coupled to a center thereof, the rotating body configured to be rotated by working fluid transmitted from the chamber during a stroke of the piston valve;

a centrifugal valve coupled to the rotational drive shaft in front of the rotating body, the centrifugal valve rotating together with the rotating body and varying an area of a flow path hole through which the working fluid passes according to a rotational speed of the rotating body; and a generator combined motor in which the rotational drive shaft is rotatably arranged at a rear of the rotating body, the generator combined motor configured to generate electric energy through the rotation of the rotational drive shaft, wherein the centrifugal valve comprises:

a valve body in which the rotational drive shaft is coupled to a center thereof, the valve body having at least one flow path hole formed therethrough in a radial direction about the rotational drive shaft;

a valve cover installed on the valve body and moving in a radial direction according to the rotation of the valve body to open and close the flow path hole; and an elastic member coupled to the valve cover to elastically support the valve cover in a direction in which the flow path hole is opened, wherein the valve body comprises:

a base plate including a pair of guide rods formed on one side thereof to support opposite sides of the valve cover so that the valve cover is slidable, and a fixing portion provided between the pair of guide rods so that one end of the elastic member is fixed, and a cover plate coupled to the one side of the base plate to prevent separation of the valve cover and the elastic member provided in the base plate; and wherein the base plate and the cover plate are provided with the flow path hole corresponding to positions at which the valve cover is moved in a radial direction, respectively.

* * * * *